Nov. 14, 1961  G. W. LANDGRAF  3,008,257
METHOD OF EMBOSSING MINERAL WOOL ACOUSTICAL PANELS
Filed Feb. 21, 1958
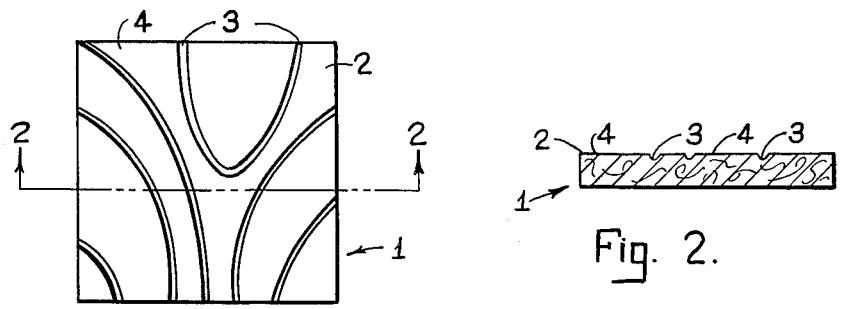
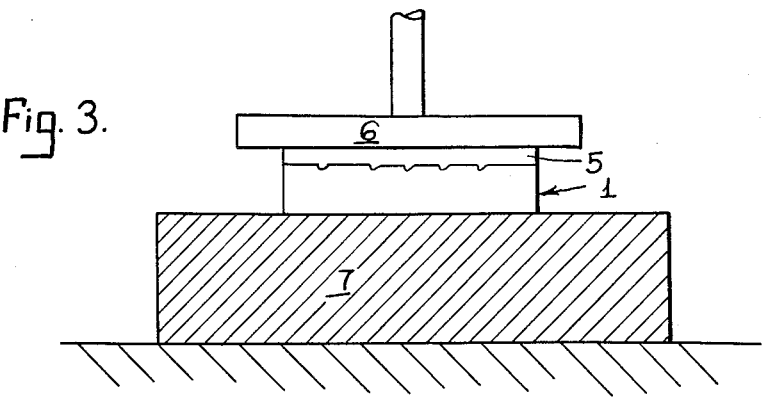
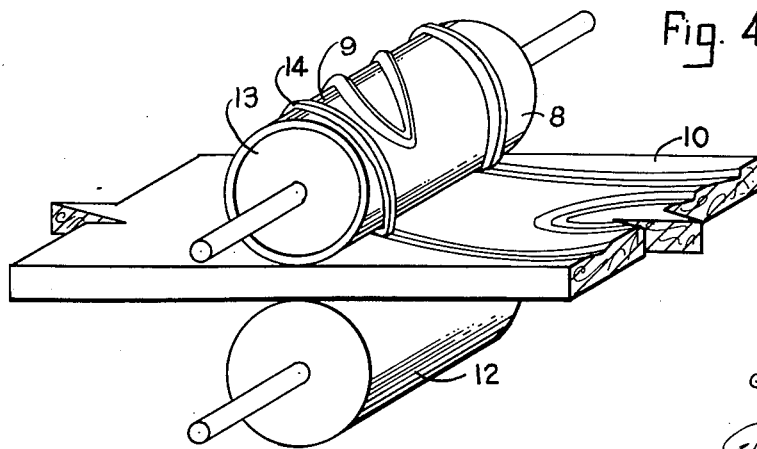
INVENTOR
GEORGE W. LANDGRAF
BY
John A. McKinney
ATTORNEY

3,008,257
METHOD OF EMBOSSING MINERAL WOOL ACOUSTICAL PANELS
George W. Landgraf, South Plainfield, N.J., assignor to Johns-Manville Corporation, New York, N.Y., a corporation of New York
Filed Feb. 21, 1958, Ser. No. 716,588
8 Claims. (Cl. 41—24)

This invention relates to acoustical constructions, and, more particularly, it relates to a new method of indenting a design into certain types of acoustical materials to increase thereby their esthetic value.

Heretofore, various methods have been utilized to improve the esthetic effects of acoustical panels. Most of the known methods include therein as a basic step the provision of a particular design or configuration on the visible surface of the panel. This surface design can be created in numerous ways. The acoustical material may be set in a mold, while in the uncured or wet condition, and the materials and mold are subjected to pressure so that after the acoustical material is heat cured and cooled, the particular panel made has indented therein or embossed thereon the particular surface configuration of the mold. Another method of increasing the esthetic effect is to adhere a pliable or thermoplastic material to the surface of the acoustical panel, and while the thermoplastic material is still in its plastic condition, it is embossed by a pressing die to imprint a particular configuration in the thermoplastic material. Still another method consists of merely pouring certain mixtures of acoustical materials into casting molds; the molds and the material are allowed to dry or are further heat treated, and when the material is removed from the mold, the acoustical panel produced thereby is embossed or indented with the configuration of the casting mold. Another very common method of improving the esthetic effect of such panels is to mechanically pierce the panel surface with a multiplicity of drills or needle points producing thereby a panel having a plurality of openings on the panel surface. Another method of opening the panel surface is to fissure the surface by an air blast or by abrasive means, while the panel is in its wet stage or in its cured stage, to produce thereby a fissured effect on the panel surface. Thus, basically the various known systems require either the treatment of the panels while such panels are in some form of uncured, wet, fluid or plastic condition, or treatment by abrasion or mechanical piercing, or by adding a particular workable surface covering to such panels.

An object of this invention is to provide a novel method for embossing or indenting certain classes of fibrous acoustical materials or panels to increase the esthetic effect of such materials or panels.

An additional object of this invention is to provide a novel method of increasing the esthetic effect of certain classes of fibrous acoustical panels, which method is the essence of simplicity and is adapted to be used on such panels when they are in their fully cured or completely dry state.

A further object of this invention is to provide a novel method of increasing the esthetic effect of certain classes of fibrous acoustical panels, which method is readily adaptable to an assembly-line system of fabricating such acoustical panels.

In essence, the invention comprises the subjection of certain classes of fibrous acoustical materials, which have been received from an assembly fabrication line in a fully cured, fully set, or dry condition, to moderate impressing by a simple die. It has been discovered that when certain classes of the higher density, fibrous acoustical materials, formed into panels, are thus subjected, a particular design configuration can be imparted to the surfaces of the acoustical panels and still have such panels and their surfaces maintain their integrity. This method of imparting a design to an acoustical panel obviates the utilizing of heat in any form on either the impressing die or the acoustical materials, obviates the working of these classes of materials in their wet or uncured stage, obviates the covering of these materials with special layers of other, more workable, types of materials, and obviates the necessity of breaking open the surface of such panels.

These and other objects will be readily apparent from the following more detailed description and the attached drawing wherein:

FIG. 1 is a plan view of an acoustical panel with a particular design indented therein by the method of the present invention;

FIG. 2 is a cross-sectional view of the panel of FIG. 1;

FIG. 3 is a simplified elevation view of a panel being pressed by a die; and

FIG. 4 is a diagrammatic view of indenting a particular contour configuration on the surface of the acoustical panels in a continuous, assembly-line process.

Referring to FIGS. 1 and 2, an acoustical panel 1, fabricated or formed according to the present invention, comprises on the surface 2 thereof a plurality of indentations 3 and a plurality of ridges 4. The indentations are oriented in such a manner that a modified wood grain effect is produced as shown in FIG. 1. The particular design shown can be altered into almost any other design. Thus, the plurality of indentations 3 may be made parallel so that a striated effect is produced. Likewise, the indentations may be made into some form of frets or concentric circular, square, or zig-zag line pattern, or the indentations may cover a wide surface area on the surface of the panel 1, or the indentations may be altered into a flower pattern. On the die 6, the design is evidenced by a plurality of raised projections extending from the base surface of the die. The latter has at least one raised surface extending laterally of the panel for an appreciable distance; the number of such laterally extending surfaces depends upon the particular design selected. For example, the raised ridge on the die 6, conforming to the U-shaped indentation 3 of FIG. 1, extends from the base surface of the die 6 and also extends laterally for a distance sufficient to form the U evidenced in FIG. 1. It is readily evident that the designs available are almost unlimited and may be changed at will to produce a given effect desired.

Referring to FIG. 3, the method of this invention comprises the pressing of a die 5, having embossed thereon the desired contour or configuration, on the surface of the acoustical panel 1. The panel 1 is placed upon the base 7 of a conventional hydraulic press, or any other form of pressure machine, and the die 5 is attached to the movable head 6, or is merely subjected to the pressure contact of head 6, and the required pressure is applied to the machine and die. When the pressure is removed from the die and the die is removed from the panel 1, the panel is seen to have the configuration of, say, FIG. 1, on the surface thereof in sharply marked delineations; the back surface of the panel is maintained relatively planar, thereby maintaining the panel suitable for mounting in a conventional manner. No heat is required to be added to either the panel or die, as the die 5 and the panel 1 may merely be subjected to pressure alone. For this reason, the die is considered to be a cold die, or at ambient temperature. The phrase, "cold die," is used to denote that the die is not artifically heated to any appreciable degree to effect the results of this invention. At the same time, neither is it artifically reduced in surface temperature.

The indentations are sharply defined and are of considerable depth; furthermore, the surface of the panel maintains its integrity to such an extent that perpendicular ridges can be formed adjacent to areas that are indented only slightly or not at all, and cleavage lines or striae may be spaced adjacent each other less than 1/8" apart. The cleavage lines or striae can be sharply defined, if so desired, so that almost razor sharp edges are produced. Consequently, the degree of designs available is further broadened, as the designs are not restricted to those of the simple and rough-cut nature but can include intricately detailed and finely lined ones.

Particular classes of fibrous acoustical materials found to be highly adaptable to the present method are of the type well known as the starch or resin-bonded mineral wool form of acoustical panels of a density exceeding 15 lbs. per cu. ft., preferably approximately 19-21 lbs. per cu. ft. These mineral wool panels, after having been received from an assembly-line process of manufacture and after having been fully cured, set, or dried, depending upon their binder, are of monolithic construction and are of relatively close texture. They are acoustically efficient, have a good handling strength, and are non-dusting. The surfaces of such formed panels are breakable, crushable or friable, i.e., the elastic limits of such surfaces are readily exceeded by the subjection of such surfaces to moderate pressures. Surprisingly, such panels, in view of their friable or crushable surfaces, maintain their integrity, when subjected to a die by the instant process, so that the indentations are sharply defined without producing ragged tearing of the surface, and without exposing to view ragged edges. Some forms of mineral wool panels are friable or crushable to such an extent that an entire panel can be broken or pulverized into a rough granular form merely by breaking away pieces of the panel by hand. Nevertheless, when such panels are embossed by the process of the present invention, the embossed or indented crushable panel surface has an appearance similar to a surface cast in a mold. The ridges of the embossing die produce sharp shearing of the friable surface of the panel leaving the remaining non-dented surface with practically no visible cracks or crushed edges.

Other classes of materials which are capable of being indented with a design by the present method are glass fiber panels of a density greater than 10 lbs. per cu. ft. and water-laid fibre panels, as, for example, mineral wool panels manufactured on a Fourdrinier machine, having a density greater than 15 lbs. per cu. ft. Such acoustical panels are also breakable by hand rending.

The pressures utilized by the press are those necessary to slightly exceed the elastic limits of the particular panel. With mineral wool panels, pressures of 5,000 to 10,000 lbs. per sq. ft. were found to be sufficient; pressures greatly exceeding the 10,000 lbs. per sq. ft. limit completely destroy the surface integrity of the panel preventing a sharp delineation of the contours of the die on the panel surface. Likewise pressures greatly below the 5,000 lbs. per sq. ft. lower limit were found to be insufficient to impress into the panel the contours of the die. With other forms of panels, such as for example, glass fibre panels, the pressure ranges differ; however, the basic principles of relative pressures still remain the same, i.e., with such other panels, pressures slightly in excess of the elastic limit of the material of the panels are necessary to create sharp indentations.

Fibrous panels produced by the above-mentioned method are also capable of having their esthetic appearance further increased by two-tone painting. Thus, the panels may be completely painted with one color prior or subsequent to the pressing operation so that the indentations 3 and the ridges 4 are similarly colored. After indentation by the die, the panels may be roller painted with a second coat of paint, of a color different from the first, so that only the ridges 4 are subjected to the second painting action. This produces panels having indentations 3 of one color and ridges 4 of a second color, i.e., a two-tone form.

In a continuous assembly line method of fabricating panels, the flat press of FIG. 3 may be changed to a roller type press with the die adhered to the peripheral surface of the roller (FIG. 4). When a continuous layer of acoustical material 10 is conveyed by a conveyor belt 11 from the final stage of an assembly line process, the material is subjected to the pressure action between rollers 12 and 13. The latter roller has adhered to its peripheral surface a circular die 8 having ridges 14 and valleys or indentations or other surfaces 9 thereon, lower than the ridges. Continuous rotation of the roller 13 produces a continuous indenting of the acoustical layer 10 by the ridges 14. The principles relating to the pressures and classes of acoustic materials in the continuous press method are the same as those relating to the flat press method.

Another distinct advantage of the present invention is that the indenting operation, if so desired, may be separate and distinct from the main fabricating system. Consequently, the panels after passing through the last stage of fabrication may be stacked and stored away. When a customer's order of a particular design is desired to be filled, the panels are removed from storage and indented with the particular design. This, of course, obviates the necessity of maintaining large inventories of panels having thereon a particular design or a small group of designs. Likewise, the particular system is capable of adapting itself very readily to the style moods of the consuming public. The latter characteristic is not only very difficult to ascertain but also is continually changing. Since large inventories of particular panel designs need not be maintained, the die designs can be changed very readily and inexpensively once the fashion mood of the consuming public has been determined. Since the pressures used are quite moderate, and heating of the dies is not required, the dies need not be expensive, and, in the case of the flat dies, may be fabricated from relatively hard wood. These types of dies may be readily discarded without any great financial loss.

Having thus described my invention in rather full detail it will be understood that the details given are for the purpose of illustration, not restriction, and that variations within the spirit of the invention are intended to be included in the scope of the appended claims.

What I claim is:

1. A method for increasing the esthetic effect of a rectangular, mineral wool fiber, acoustical panel having its major surfaces relatively planar, and said panel having a density of at least about 15 pounds per cubic foot and the body thereof breakable by hand rending, comprising fabricating said mineral wool acoustical panel into a preformed, cured, dry shape, applying on a major surface of the panel a relatively cold die, having at least one raised ridge projection at least partially continuous laterally, and subjecting the die to a pressure in excess of the elastic limits of the latter major surface of the particular dry, mineral wool, acoustical panel to impart to said surface of the acoustical panel the design of the die while maintaining the surface integrity thereof.

2. A method of increasing the esthetic appearance of a dry, fully cured, mineral wool acoustical panel, said panel having a density of at least about 15 pounds per cubic foot and a body breakable by hand rending, comprising compressing a major surface of said dried, cured mineral wool acoustical panel by a relatively cold die, said die having a plurality of ridges forming a design and at least several of said ridges having a considerable transverse dimension, said die being applied at a pressure in the order of about 5,000 to 10,000 pounds per cubic foot to produce a plurality of corresponding indentations in the panel surface while maintaining the surface integrity of the panel, painting the complete panel surface, and repainting the non-depressed areas of the surface of the panel whereby a two-tone color effect is produced on the panel surface.

3. A method of improving the esthetic appearance of a dry, cured, acoustical panel comprising mineral wool fibers and a binder, said panel having a density of at least about 15 pounds per cubic foot and its body breakable by hand rending, comprising compressing the dry acoustical panel by a relatively cold, rotating roller-type die having a variable surface contour, the raised projections of which are at least partially continuous laterally, at a pressure at least in excess of the elastic limits of the surface of the panel to impart an indented design to the panel surface thereby improving its esthetic appearance while maintaining the surface integrity thereof.

4. A method of improving the esthetic appearance of a dry, cured, mineral wool, acoustical panel having a density of at least about 15 pounds per cubic foot, a body breakable by hand rending, and a surface that is relatively planar, comprising compressing said relatively planar surface by a relatively cold die having a variable surface contour, the raised projections of which are at least partially continuous laterally, at a pressure in excess of the elastic limits of the surface of the particular panel.

5. A method for increasing the esthetic effect of a dry, mineral wool, acoustical panel comprising, fabricating into a desired dry shape a mineral wool acoustical panel with a major surface thereof relatively planar, and said panel having a density of at least about 15 pounds per cubic foot and the body thereof breakable by hand rending, applying on a surface of the panel a relatively cold die, having a design thereon of a variable surface contour, the elevations of which are at least partially continuous laterally, and subjecting the die to a pressure in the order of about 5,000 to 10,000 pounds per square foot to impart to the surface of the panel the design of the die while maintaining the surface integrity of the panel.

6. A method of increasing the esthetic effect of a dry, cured, acoustical panel having a substantial portion of mineral wool fibers therein, and said panel having a density of at least about 15 pounds per cubic foot and the body thereof being breakable by hand rending, comprising applying a relatively cold die on the surface of the panel, said die having a design thereon of at least one raised surface which extends laterally for an appreciable distance, and subjecting the die to a pressure in excess of the elastic limits of the surface of the dry acoustical panel to present at least one raised surface of the die into the surface of the panel thereby to impart to the panel surface the design of the die while maintaining the surface integrity of the panel.

7. A method of imparting a fixed design consistently to a mineral wool acoustical panel having a pair of opposed relatively planar major surfaces, said panel being in a relatively dry state, and said panel being of a density of at least about 15 pounds per cubic foot and its body thereof breakable by hand rending comprising, applying on one of said surfaces a relatively cold die, having a variable surface contour thereupon, the elevations of which are at least partially continuous laterally, subjecting the die and panel to relative pressure in the order of about 10,000 pounds per square foot to force said contoured surfaces of the die into the adjacent surfaces of the panel while maintaining the opposite surface of the panel relatively planar, said adjacent panel surface receiving the impression of the contour of the die while maintaining its surface integrity.

8. A method of imparting a fixed, consistent design to a mineral wool, acoustical panel having a pair of opposing, relatively planar major surfaces, said panel being in a relatively dry state, and said panel having a density of at least approximately 15 pounds per cubic foot and being capable of decimation by hand rending, comprising applying to adjacent one of said friable surfaces a relatively cold die, having a contoured design, the elevations of which are at least partially continuous laterally, subjecting the die and panel to a relative pressure in excess of the elastic limits of said panel surface to force the contoured design portion of the die into the adjacent panel surface while maintaining the opposite surface of the panel relatively planar and suitable for mounting, said adjacent panel surface receiving a sharp impression of the contour of the die while maintaining its surface integrity.

References Cited in the file of this patent

UNITED STATES PATENTS

| | | |
|---|---|---|
| 91,540 | Jenks | June 22, 1869 |
| 412,299 | Sears | Oct. 8, 1889 |
| 1,461,337 | Weiss | July 10, 1923 |
| 1,943,663 | Ericson | Jan. 16, 1934 |
| 2,085,875 | Sirovy | July 6, 1937 |
| 2,095,304 | Zinser | Oct. 12, 1937 |
| 2,216,803 | Benda | Oct. 8, 1940 |
| 2,248,233 | Heritage | July 8, 1941 |
| 2,317,504 | Walter | Apr. 27, 1943 |
| 2,645,049 | Brown | July 14, 1953 |
| 2,803,188 | Duvall | Aug. 20, 1957 |

FOREIGN PATENTS

| | | |
|---|---|---|
| 9,091 | Great Britain | 1884 |

OTHER REFERENCES

Waldron Embossing Machines, Catalogue No. 110, Published by Waldron Co., New Brunswick, N.J., CPW 1936, pages 3 and 4.